United States Patent

[11] 3,633,780

[72] Inventor Anders Ruben Rausing
    Rome, Italy
[21] Appl. No. 19,044
[22] Filed Mar. 12, 1970
[45] Patented Jan. 11, 1972
[73] Assignee Sobrefina SA
    Fribourg, Switzerland
[32] Priority Mar. 27, 1969
[33] Sweden
[31] 4285/69

[54] PACKAGING CONTAINERS COMPRISING A
    CONTAINER BODY OF A CHLORINATED
    PLASTIC MATERIAL
    5 Claims, 1 Drawing Fig.
[52] U.S. Cl................................................ 215/12 R,
    215/1 C, 220/DIG. 30, 229/3.5 R
[51] Int. Cl........................................................ B65d 11/04
[50] Field of Search............................................ 229/14 R,
    14 B, 14 BE, 14 BL, 3.5 R; 215/1 C, 12 R; 150/.5;
    220/DIG. 30

[56] References Cited
UNITED STATES PATENTS
3,325,030 6/1967 Rausing.......................... 215/12 R
2,926,097 2/1960 Leatherman.................. 106/17

Primary Examiner—Donald F. Norton
Attorney—Pierce, Scheffler & Parker

ABSTRACT: A container composed at least in part of a chlorinated plastic having associated with it a calcium salt, such as calcium carbonate, which will react with the hydrochloric acid which is liberated when the plastic container is disposed of by burning or incineration and thus eliminate the corrosive affects of hydrochloric acid.

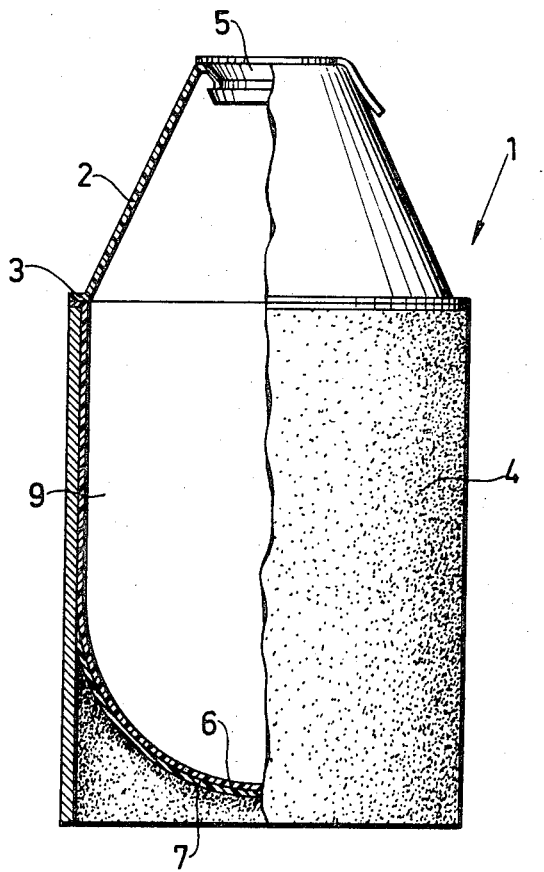

PACKAGING CONTAINERS COMPRISING A CONTAINER BODY OF A CHLORINATED PLASTIC MATERIAL

This invention relates to a packaging container comprising a container body of a chlorinated plastic material such as polyvinyl chloride.

There has lately arisen a need to replace glass by plastic materials in at least some types of package, the main reasons being that plastic materials are lighter than glass, they do not splinter when subjected to mechanical stresses, and are in general combustible. Different plastic materials naturally have different properties as regards e.g. impermeability, and a plastic material possessing the appropriate properties has to be chosen for each product. It has been found that for goods such as beer, aerated drinks etc. which need a gastight package, it is best to make the packages from polyvinyl chloride which has satisfactory impermeability to most gases.

Thick-walled bottles of polyvinyl chloride have been made for a comparatively long time, and these bottles have practically the same characteristics as traditional bottles, the only difference being that glass material has been replaced by polyvinyl chloride. Naturally, these bottles are lighter than comparable glass bottles, but since they must have thick walls owing to the high pressure that obtains inside beer packages, they are relatively expensive. Another, more up-to-date, version of the polyvinyl chloride bottle consists of a thin inner container of polyvinyl chloride that has a conical or curved top part, a curved, preferably hemispherical, bottom part and a cylindrical intermediate part. In this more modern container, the cylindrical intermediate part is surrounded by a close-fitting stiff outer sleeve of e.g. cardboard, the object of this sleeve being that it should take up the stresses emanating from the material packaged and acting on the intermediate part of the inner container. Owing to the conical and curved shapes of the top and bottom parts respectively, the tensile stresses in these parts are not as high as would be the stresses in the intermediate part in the absence of the outer sleeve.

The above bottles or containers containing polyvinyl chloride, mentioned above, have the drawback however that hydrochloric acid is liberated when the plastic material is burned. Although this drawback is substantially less pronounced in the case of thin-walled containers than in the case of thick-walled bottles, since the latter contain considerably more plastic material, it is nevertheless desirable, owing to the fact that hydrochloric acid is very corrosive and the incidence of packaging containers of this type is expected to be high, that release of hydrochloric acid with its destructive environmental effects should be avoided or at least reduced as far as possible.

This invention specifies a packaging container containing polyvinyl chloride, in which the above drawbacks are however avoided, the packaging container in accordance with this invention being characterized by the fact that the container body, or a part joined thereto, contains a calcium salt, preferably calcium carbonate, which when the packaging container is burned is designed to react chemically with the hydrochloric acid liberated when the plastic material is burned.

The invention will be described below by reference to the attached diagrammatic drawing which shows a packaging container in accordance with the invention.

The packaging container shown in the drawing comprises an inner container 1 and an outer sleeve 4 of e.g. cardboard. The inner container 1 consists of two parts, namely a top or upper part 2 that is provided with an opening and a cap 5, and a lower part 9 comprising a cylindrical portion and a curved bottom portion 6. The two parts of the container, 2 and 9, which are both made of polyvinyl chloride, most conveniently by vacuum-drawing a plastic film heated to its softening temperature, are joined to one another along a common sealing flange 3. The outer sleeve 4 surrounding the cylindrical portion 9 of the inner container 1 has a close fit with this and is designed to take up the stresses acting on the said cylindrical portion 1 which emanate from the material packaged. Since for technical reasons the top part 2 must be somewhat thicker than the lower part 9, it is possible in some cases to admix finely divided calcium carbonate ($CaCO_3$) to the plastic material which is to form the top part 2. It is also possible to add finely divided calcium carbonate to the sleeve 4 or, for instance, to provide the bottom portion 6 of the inner container 1 with a coating 7 of calcium carbonate. In the latter case, powdered calcium carbonate may be mixed with an adhesive and then applied to the bottom portion 6 by brushing, dipping or spraying.

When the packaging container is to be disposed of after use, it is most convenient to destroy it by burning in an incinerator or on a bonfire. As has been mentioned above, hydrochloric acid (HCl) which is a very corrosive acid is liberated when the packaging container is burned, and tests have shown that about 5 g. hydrochloric acid is formed from a packaging container of the above type whose plastics constituent weighs about 10 g. Owing to the fact, however, that part of the hydrochloric acid immediately reacts with substances in the flue gases normally met with in an incinerator, the quantity of the hydrochloric acid liberated is reduced to 2.5–3 g. In a packaging container in accordance with this invention, however, the quantity of hydrochloric acid liberated will be further reduced by virtue of the fact that the calcium carbonate contained either in the plastic wall of the packaging container, in the outer sleeve 4, in a coating 7 applied to the outside of the inner container 1 or simultaneously in some or all of these positions, will react chemically with the hydrochloric acid as shown below:

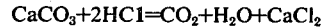
$$CaCO_3 + 2HCl = CO_2 + H_2O + CaCl_2$$

The corrosive hydrochloric acid (HCl) thus reacts with the calcium carbonate ($CaCO_3$) to form carbon dioxide ($CO_2$), water ($H_2O$) and calcium chloride ($CaCl_2$), of which substances water and carbon dioxide occur naturally and calcium chloride is mostly in the nature of a fertilizer.

In order to react completely with the 2.5–3 g. hydrochloric acid mentioned previously, which is liberated when a packaging container is burned, the quantity of calcium carbonate required is 3.5–4 g., which quantity can be applied to the packaging container by one or more of the methods enumerated above. Even if it should be decided that an addition of 4 g. of calcium carbonate is too much for some packaging containers, the quantity of hydrochloric acid liberated can nevertheless be reduced to insignificant proportions by the addition of calcium carbonate.

It is probably most advantageous to mix the calcium carbonate into the paper mass from which the sleeves 4 are to be made, and it may be found sufficient in practical cases to confine the measures taken to an admixture of calcium carbonate to the sleeve material. The other methods, namely those of mixing calcium carbonate into the plastic material or coating the outside of the inner container with a layer of calcium carbonate, are more difficult to carry out and less attractive, and should not be resorted to other than in cases where a sufficient quantity of calcium carbonate cannot be supplied by way of the sleeve.

If the packaging container in accordance with this invention is burned at a temperature appreciably above 600° C., e.g. at 900° C., the calcium carbonate is converted to calcium oxide and carbon dioxide in accordance with the formula

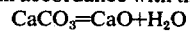
$$CaCO_3 = CaO + H_2O$$

but this is of no major significance since calcium oxide reacts with hydrochloric acid to form calcium chloride and water:

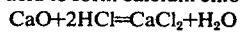
$$CaO + 2HCl = CaCl_2 + H_2O$$

It is seen therefore that the final product in this reaction also is calcium chloride.

It has been found in practical tests that the reduction in the quantity of hydrochloric acid liberated, which is achieved when packaging containers in accordance with this invention are used, is considerable.

The invention is however applicable not only to packaging containers described in this constructional example, and it is for instance possible, within the framework of the idea underlying the invention, to mix calcium carbonate into the plastic material used for the thick-walled polyvinyl chloride bottles referred to in the introduction, which have received some application as packaging containers for beer and similar liquids under pressure.

I claim:

1. A packaging container comprising a container body composed of a chlorinated plastic material, at least a portion of the container having associated therewith calcium carbonate in an amount so that, when said container is disposed of by incineration, at least a major portion of the hydrochloric acid evolved therefrom will react chemically with said calcium carbonate to form calcium chloride and thus substantially reduce the amount of hydrochloric acid entering the atmosphere.

2. A packaging container as claimed in claim 1, and further comprising a sleeve of relatively stiff carton material surrounding at least a portion of said container, and wherein said calcium carbonate is combined with said carton material.

3. A packaging container as claimed in claim 1, wherein at least a portion of the outside of said container is provided with a coating containing said calcium carbonate.

4. A packaging container as claimed in claim 3, wherein said coating comprises said calcium carbonate and an adhesive for securing said carbonate to said container.

5. A packaging container as claimed in claim 1, wherein the amount of calcium carbonate associated with the container is from about 35 to about 40 percent of the weight of the chlorinated plastic material in said container.

* * * * *